United States Patent
Chen

(10) Patent No.: US 9,158,346 B2
(45) Date of Patent: Oct. 13, 2015

(54) MAIN BOARD AND METHODS FOR DISPOSING MEMORY SLOTS ON THE MAIN BOARD

(71) Applicant: Celestica Technology Consultancy (Shanghai) Co., Ltd., Shanghai (CN)

(72) Inventor: Yung-Chieh Chen, Taipei (TW)

(73) Assignee: Celestica Technology Consultancy (Shanghai) Co., Ltd., Shanghai (CN)

( * ) Notice: Subject to any disclaimer, the term of this patent is extended or adjusted under 35 U.S.C. 154(b) by 155 days.

(21) Appl. No.: 13/899,136

(22) Filed: May 21, 2013

(65) Prior Publication Data

US 2014/0177159 A1      Jun. 26, 2014

(51) Int. Cl.
*G06F 1/16*          (2006.01)
*G06F 1/18*          (2006.01)

(52) U.S. Cl.
CPC .............. *G06F 1/185* (2013.01); *Y10T 29/4913* (2015.01)

(58) Field of Classification Search
CPC ...... G06F 1/185; H01L 24/00; Y10T 29/4913
USPC ............ 174/250–253, 255, 260; 361/679.32, 361/752, 792, 788, 791, 785; 710/300, 301, 710/104, 122
See application file for complete search history.

(56) References Cited

U.S. PATENT DOCUMENTS

| | | | |
|---|---|---|---|
| 2002/0160743 A1* | 10/2002 | Vianna et al. ................. | 455/349 |
| 2011/0271025 A1* | 11/2011 | Chen et al. .................... | 710/300 |
| 2014/0111931 A1* | 4/2014 | Casserly et al. ......... | 361/679.32 |
| 2014/0139994 A1* | 5/2014 | Shih et al. ................ | 361/679.32 |
| 2014/0160664 A1* | 6/2014 | Yang ........................ | 361/679.32 |
| 2015/0003002 A1* | 1/2015 | Yang ........................ | 361/679.32 |

* cited by examiner

*Primary Examiner* — Yuriy Semenenko
(74) *Attorney, Agent, or Firm* — Novick, Kim & Lee, PLLC; Jae Youn Kim

(57) ABSTRACT

A main board, comprising a first set of memory slots, the first set of memory slots comprising a first channel and a second channel disposed in parallel with each other, and each of the first channel and the second channel comprising a first type of slot and a second type of slot respectively, wherein the first type of slot and the second type of slot of the first channel are disposed at a first side and a second side of the first channel respectively, the first type of slot and the second type of slot of the second channel are disposed at a first side and a second side of the second channel respectively, and the first side of the first channel is adjacent to the first side of the second channel.

15 Claims, 4 Drawing Sheets

MAIN BOARD AND METHODS FOR DISPOSING MEMORY SLOTS ON THE MAIN BOARD

CROSS REFERENCE TO RELATED APPLICATION

This application claims priority to Chinese Patent Application No. 201210576975, filed on Dec. 26, 2012.

BACKGROUND OF THE INVENTION

The present invention relates to personal computer or server. The present invention relates to a main board of a server, and more particularly, relates to a mixed type of memory slots disposed on a main board of a server.

FIG. 1 is a top view of a main board 1A of a half-width server in prior art. As shown in FIG. 1, the main board 1A of the half-width server includes a plurality of (for example: two) central processing units (CPUs) 2-1 and 2-2, a plurality of peripheral chipsets (for example: a south bridge chipset 3-1 and a network communication controlling chipset 3-2) and a plurality of (for example: two sets) memory sets 4-1, 4-2, 5-1 and 5-2. The peripheral chipsets 3-1 and 3-2 are disposed at the rear side 1b of the main board 1A.

As shown in FIG. 1, air flow A provided by cooling fans flows from the front side 1a of the main board 1A to the rear side 1b of the main board 1A. Since the distance W between the plurality of (for example: four) memory modules of each of the memory sets 4-1, 4-2, 5-1 and 5-2 is small, the air flow A may be blocked and cooling efficiency may thus be deteriorated, which may cause overheating of the CPU 2-2 and the memory sets 4-1, 4-2, 5-1 and 5-2. Accordingly, in the design of the half-width sever, such main board 1A structure may not fully support the CPUs 2-1 and 2-2 and the memory sets 4-1, 4-2, 5-1 and 5-2 of all the levels and standards. Furthermore, overheating of the peripheral chipsets 3-1 and 3-2 disposed at the rear side 1b of the main board 1A may also occur.

Moreover, each of the memory slots for the memory sets 4-1, 4-2, 5-1 and 5-2 includes a number of through holes. If the signal wires from the rear side 1b of the main board 1A (for example, signal wires S of the peripheral chipsets 3-1 and 3-2) are designed to connect to the front side 1a of the main board 1A, it is necessary to increase the number of layers of the main board 1A or shorten the distance W between every memory modules of the memory sets 4-1, 4-2, 5-1 and 5-2 the to make a space close to one side 1c of the main board 1A so that the signal wires S may pass the space and connect to the front side 1a of the main board 1A.

However, the electric magnetic field M generated by high speed signals which are transmitted through the signal wires S may radiate outward from the side 1c of the main board 1A. Furthermore, overheating problems of the memory sets 4-1, 4-2, 5-1 and 5-2 may get worse if the distance W between the memory modules of the memory sets 4-1, 4-2, 5-1 and 5-2 is reduced.

In order to overcome the overheating of the CPU and memory modules and electric magnetic radiation from the signal wires of the main board of the half-width server in prior art, the present invention provides a mixed type of memory slots which include surface mounted slots and through hole slots.

BRIEF SUMMARY OF THE INVENTION

Examples of the present invention may provide a main board, the main board includes a first set of memory slots, the first set of memory slots comprising a first channel and a second channel disposed in parallel with each other, and each of the first channel and the second channel comprising a first type of slot and a second type of slot respectively, wherein the first type of slot and the second type of slot of the first channel are disposed at a first side and a second side of the first channel respectively, the first type of slot and the second type of slot of the second channel are disposed at a first side and a second side of the second channel respectively, and the first side of the first channel is adjacent to the first side of the second channel.

Some examples of the present invention may provide a main board, the main board includes a first set of memory slots, the first set of memory slots includes a first channel and a second channel disposed in parallel with each other, and each of the first channel and the second channel has a surface mounted slot and a through hole slot respectively, wherein the surface mounted slot and the through hole slot of the first channel are disposed at a first side and a second side of the first channel respectively, the surface mounted slot and the through hole slot of the second channel are disposed at a first side and a second side of the second channel respectively, and the first side of the first channel is adjacent to the first side of the second channel.

Other examples of the present invention may provide a method of disposing memory slots on a main board, the method includes the steps of: disposing a central processing unit (CPU) on the main board, disposing a first memory channel at a side adjacent to the CPU, disposing a second memory channel at another side adjacent to the first memory channel with respect to the CPU, disposing a first type of slot and a second type of slot at a first side and a second side of the first memory channel respectively, and disposing a first type of slot and a second type of slot at a first side and a second side of the second memory channel respectively, wherein the first memory channel is in parallel with the second memory channel, the first side of the first memory channel is adjacent to the first side of the second memory channel, and the second side of the first memory channel is adjacent to the CPU.

Additional features and advantages of the present invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings examples which are presently preferred. It should be understood, however, that the invention is not limited to the precise arrangements and instrumentalities shown.

In the drawings.

DETAILED DESCRIPTION OF THE INVENTION

Reference will now be made in detail to the present examples of the invention, examples of which are illustrated in the accompanying drawings. Wherever possible, the same reference numbers will be used throughout the drawings to refer to the same or like parts.

Figure 1:
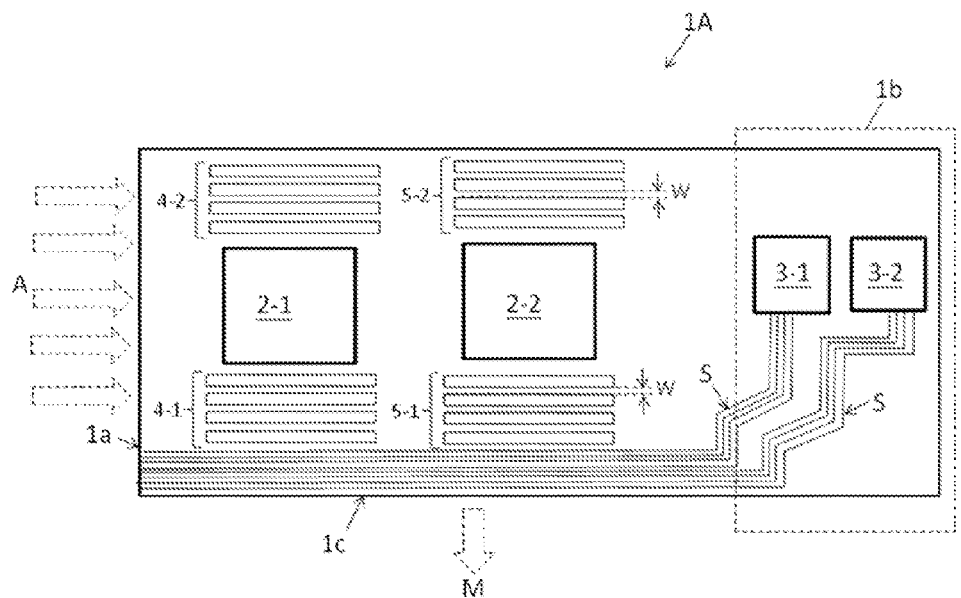
FIG. 1 is a top view of a main board of a half-width server in prior art.
Figure 2:
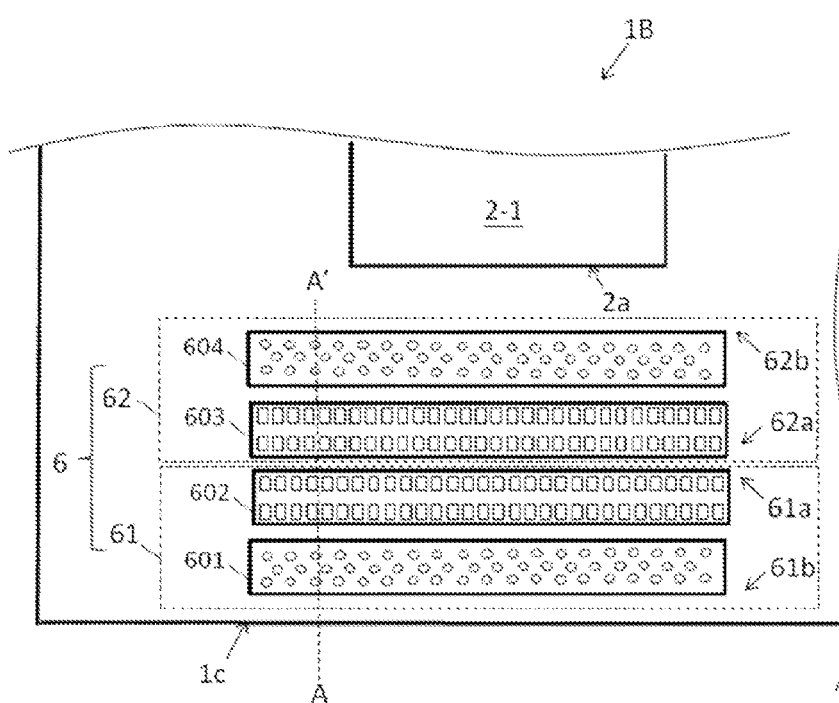
FIG. 2 is a partial top view of a main board including a mixed type of memory slots in accordance with an example of the present invention.

FIG. 2 is a partial top view of a main board 1B including a mixed type of memory slots 6 in accordance with an example of the present invention. As shown in FIG. 2, the mixed type of memory slots 6 are disposed between the central processing unit (CPU) 2-1 and a side 1c of the main board 1B. A memory set (such as the memory set 4-1 shown in FIG. 1), may be disposed on the main board 1B through the mixed type of memory slots 6.

The mixed type of memory slots 6 include two channels 61 and 62. The channel 61 includes two memory slots 601 and 602 and the channel 62 includes two memory slots 603 and 604. Among the memory slots 601, 602, 603 and 604, the memory slots 602 and 603 which are adjacent to each other, are surface mounted slots. The memory slots 601 and 604 are through hole slots.

In other words, the through hole memory slot 601 is disposed adjacent to the side 1c of main board 1B, and the through hole memory slot 604 is disposed adjacent to the CPU 2-1. Furthermore, the surface mounted memory slots 602 and 603 are disposed between the through hole memory slots 601 and 604.

Figure 3:
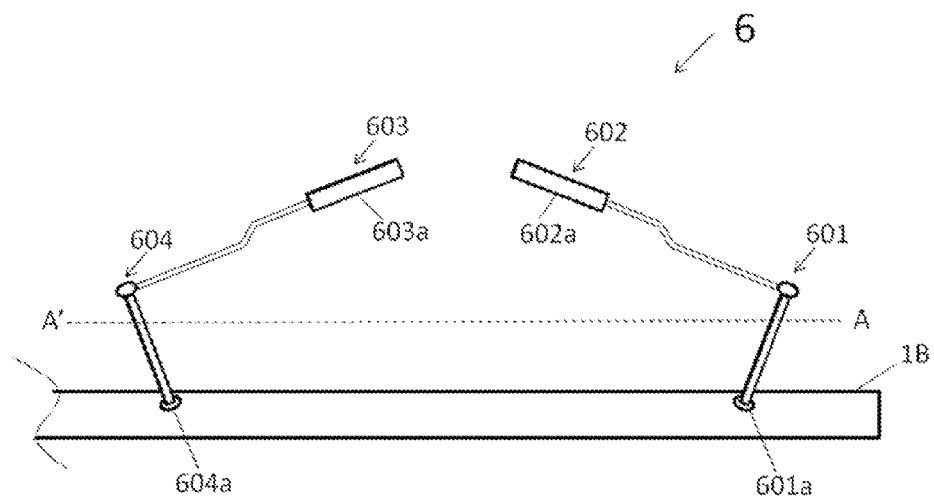
FIG. 3 is a cross-sectional view of the mixed type of memory slots illustrated in FIG. 2 along a line A-A' in accordance with an example of the present invention.

FIG. 3 is a cross-sectional view of the mixed type of memory slots 6 illustrated in FIG. 2 along a line A-A' in accordance with an example of the present invention. As shown in FIG. 3, the through hole memory slots 601 and 604 are connected to the main board 1B via through holes 601a and 604a respectively. Furthermore, the through hole memory slots 601 and 604 are connected to the surface mounted memory slots 602 and 603 respectively.

Bonding pad 602a of the surface mounted memory slot 602 and bonding pad 603a of the surface mounted memory slot 603 may suspend or float over the main board 1B. Therefore, a space may be formed between the through hole memory slots 601 and 604 and under the surface mounted memory slots 602 and 603 so that signal wires (such as the signal wires S shown in FIG. 1) may pass through the space. Thereby, there may be more options for routing wires on the main board 1B.

Moreover, air flow A as shown in FIG. 1 may flow through the space, that may significantly lower the temperature of the memory set 4-1 disposed on the mixed type of memory slots 6.

Figure 4:
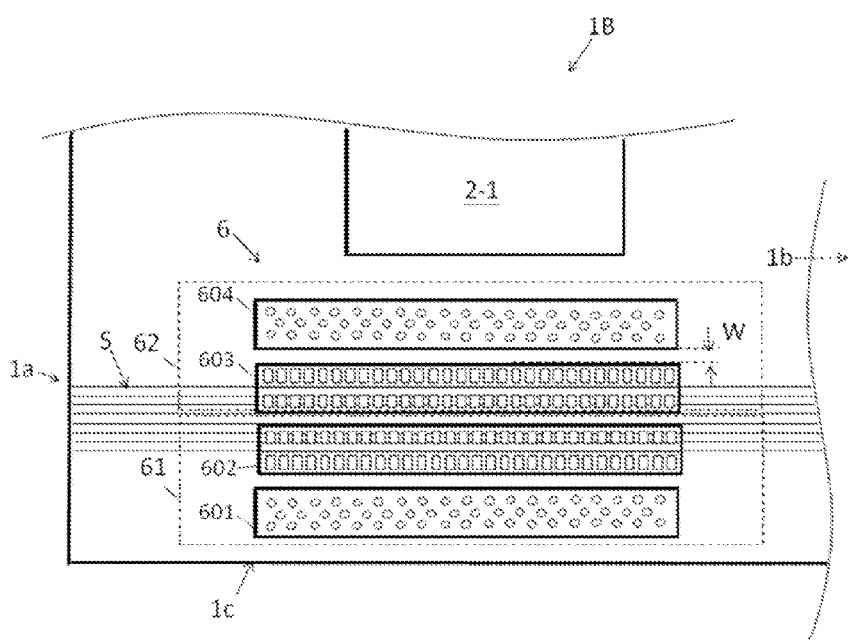
FIG. 4 is another top view of the main board including the mixed type memory slots as illustrated in FIG. 2 in accordance with another example of the present invention.

FIG. 4 is another top view of the main board 1B including the mixed type memory slots 6 as illustrated in FIG. 2 in accordance with another example of the present invention. As shown in FIG. 4, the signal wires S from the rear side 1b of the main board 1B may pass through the space between the through hole memory slots 601 and 604 and under the surface mounted memory slots 602 and 603 to connect to the front side 1a of the main board 1B. Therefore, it is not necessary to reduce the distance W between the memory modules of the memory set (e.g. the memory set 4-1) which are disposed on the mixed type of memory slots 6, and the distance between the memory modules as required by some design rules may thus be met.

Figure 5:
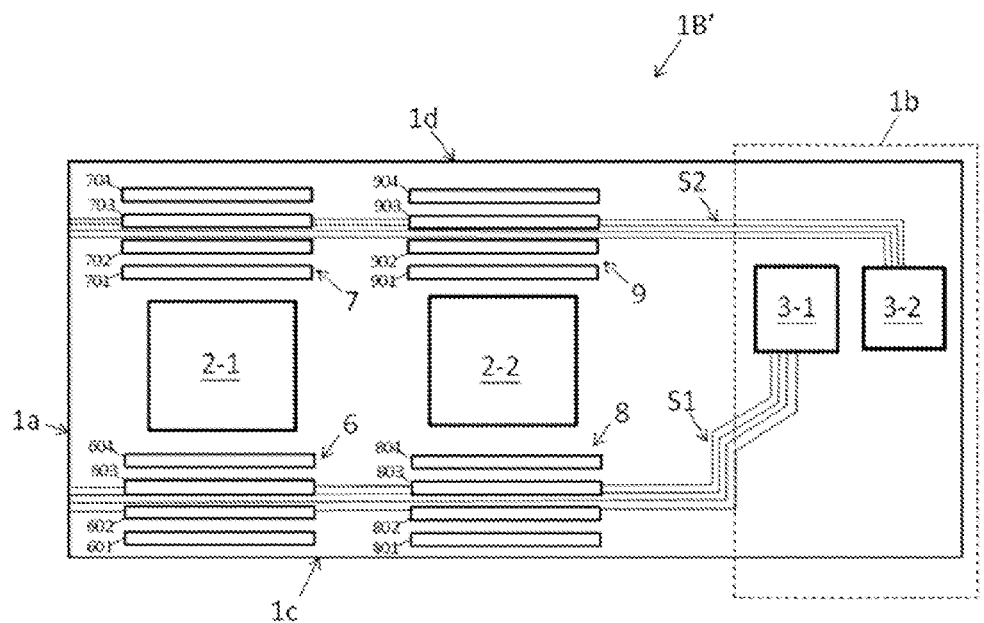
FIG. 5 is a top view of a main board including a mixed type of memory slots in accordance with still another example of the present invention.

FIG. 5 is a top view of a main board 1B' including a mixed type of memory slots in accordance with still another example of the present invention. Memory slots 7, 8, and 9 shown in FIG. 5 may have the same or similar structure to the mixed type of memory slots 6 shown in FIGS. 2, 3 and 4. Specifically, the memory slots 7 include through hole memory slots 701 and 704 and surface mounted memory slots 702 and 703. The through hole memory slot 701 is disposed adjacent to the CPU 2-1, and the through hole memory slot 704 is disposed adjacent to a side 1d of the main board 1B'. Furthermore, the surface mounted memory slots 702 and 703 are disposed between the through hole memory slots 701 and 704.

In another aspect, the memory slots 8 includes through hole memory slots 801 and 804 and surface mounted memory slots 802 and 803. The through hole memory slot 804 is disposed adjacent to the CPU 2-2, and the through hole memory slot 801 is disposed adjacent to the side 1c of the main board 1B'. Furthermore, the surface mounted memory slots 802 and 803 are disposed between the through hole memory slots 801 and 804.

Similar to the way of disposing the memory slots 7, the memory slots 9 include through hole memory slots 901 and 904 and surface mounted memory slots 902 and 903. The through hole memory slot 901 is disposed adjacent to the CPU 2-2, and the through hole memory slot 904 is disposed adjacent to the side 1d of the main board 1B'. Furthermore, the surface mounted memory slots 902 and 903 are disposed between the through hole memory slots 901 and 904.

In the manner of disposing the memory slots as disclosed above, the signal wires from the rear side 1b of the main board 1B' may pass the spaces of the mixed type of memory slots 6, 7, 8, and 9 respectively to connect to the front side 1a of the main board 1B'. For example, signal wires S1 of the peripheral chipset 3-1 (such as the south bridge chipset) may be routed to the front side 1a of the main board 1B' through the space of the mixed type of memory slots 6 and 8. Furthermore, signal wires S2 of the peripheral chipset 3-2 (such as the network communication controlling chipset) may be routed to the front side 1a of the main board 1B' through the space of the mixed type of memory slots 7 and 9.

Figure 6:
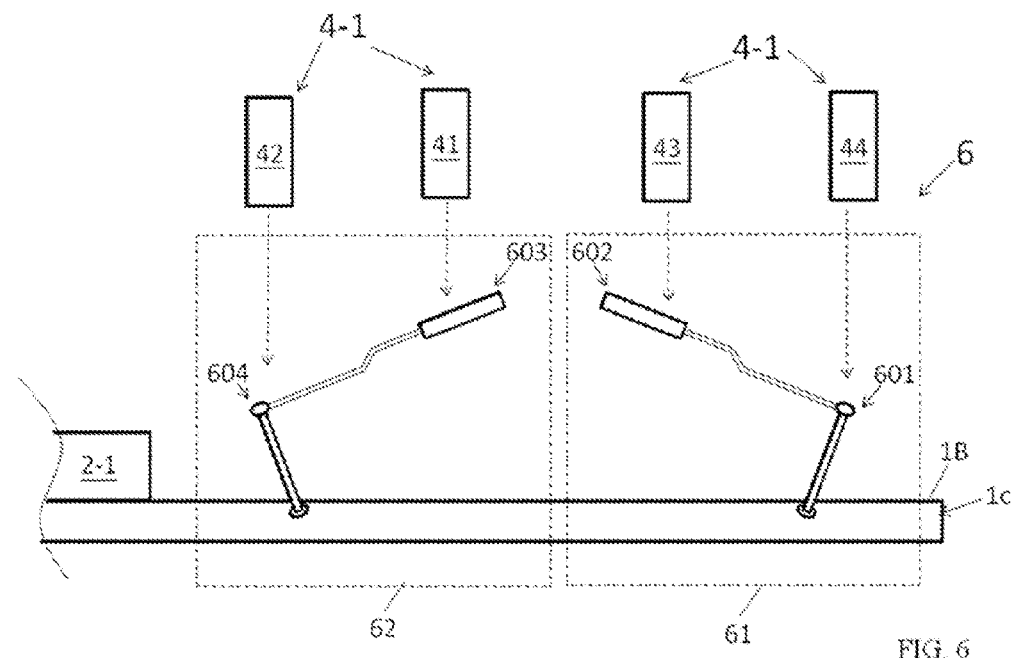
FIG. 6 illustrates a method of disposing a memory set which correspond to the mixed type of memory slots in accordance with an example of the present invention.

FIG. 6 illustrates a method of disposing the memory set 4-1 which correspond to the mixed type of memory slots 6 in accordance with an example of the present invention. As shown in FIG. 6, the through hole memory slot 601 is disposed adjacent to the side 1c of the main board 1B and the through hole memory slot 604 is disposed adjacent to the CPU 2-1. Furthermore, the surface mounted memory slots 602 and 603 are disposed between the through hole memory slots 601 and 604.

In this example, the memory set 4-1 which corresponds to the mixed type of memory slots 6, may include at least one memory module. If the memory set 4-1 includes only one memory module 41, the memory module 41 may be disposed on the surface mounted memory slot 603. Furthermore, if the memory set 4-1 includes two memory modules 41 and 42, the memory modules 41 and 42 may be disposed on the surface mounted memory slot 603 and in turn on the through hole memory slot 604. Moreover, if the memory set 4-1 includes three memory modules 41, 42 and 43, the memory modules 41, 42 and 43 may in turn be disposed on the surface mounted memory slot 603 and the through hole memory slot 604 and the surface mounted memory slot 602. In addition, if the memory set 4-1 includes four memory modules 41, 42, 43 and 44, the memory modules 41, 42, 43 and 44 may in turn be disposed on the surface mounted memory slot 603, the through hole memory slot 604, the surface mounted memory slot 602 and the through hole memory slot 601.

Figure 7:
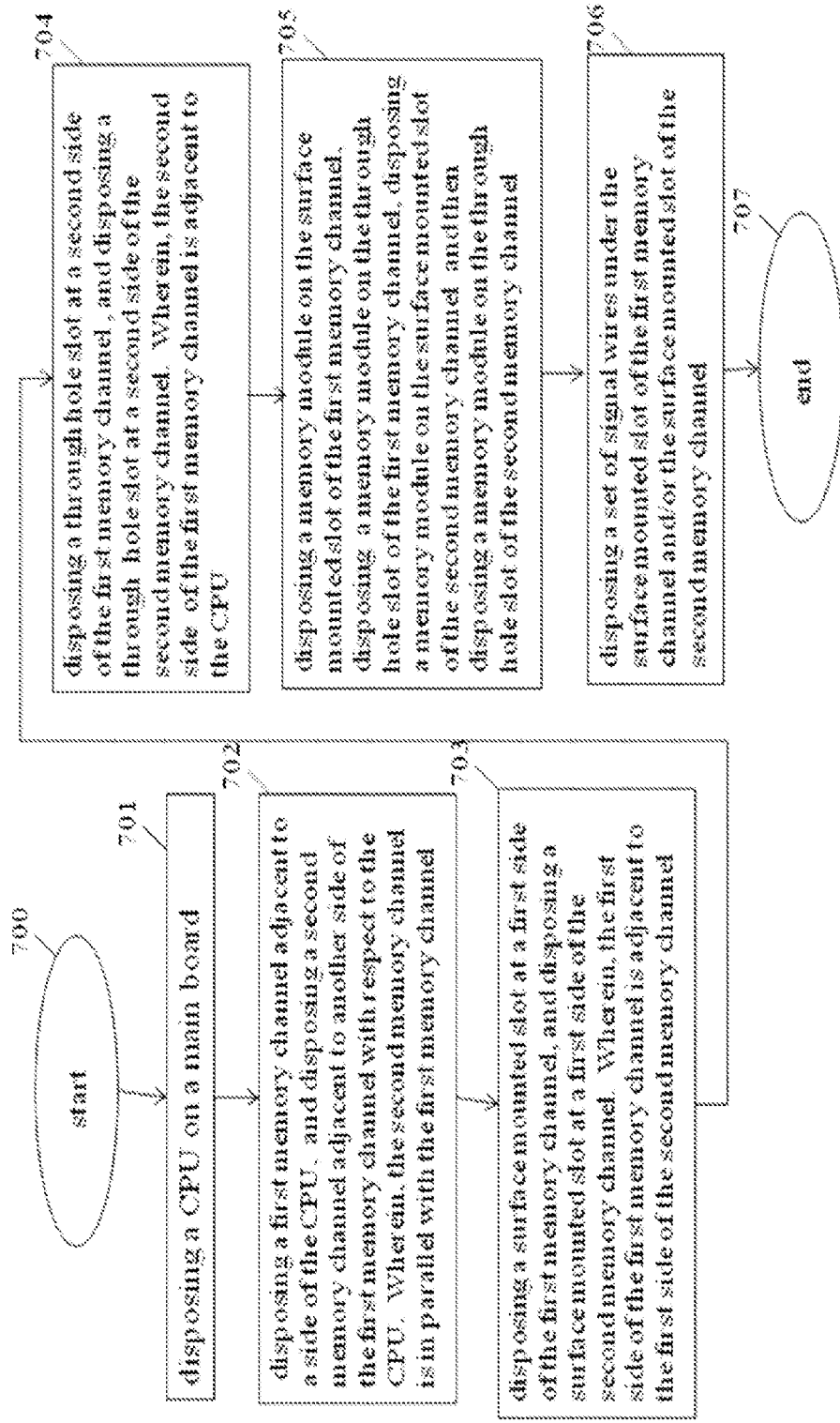
FIG. 7 is a flow diagram illustrating a method of disposing the mixed type of memory slots on a main board in accordance with an example of the present invention.

FIG. 7 is a flow diagram illustrating a method of disposing mixed type of memory slots on a main board in accordance with an example of the present invention. In step 701, a CPU 2-1 is disposed on the main board 1B shown in FIG. 2.

Next, in step 702, a first memory channel 62 is disposed adjacent to a side 2a of the CPU 2-1 and a second memory channel 61 is disposed adjacent to another side of the first memory channel 62 with respect to the CPU 2-1. Wherein, the second memory channel 61 is in parallel with the first memory channel 62.

Next, in step 703, the surface mounted slot 603 is disposed at a first side 62a of the first memory channel 62, and the surface mounted slot 602 is disposed at a first side 61a of the second memory channel 61. In one example embodiment, the first side 62a of the first memory channel 62 is adjacent to the first side 61a of the second memory channel 61.

Next, in step 704, the through hole slot 604 is disposed at a second side 62b of the first memory channel 62, and the through slot 601 is disposed at a second side 61b of the second memory channel 601. In one example embodiment, the second side 62b of the first memory channel 62 is adjacent to the CPU 2-1.

As shown in FIG. 6, the memory set 4-1 includes four memory modules 41 to 44. In step 705 which is subsequent to the step 704, the memory modules 41 to 44 are in turn disposed on the memory slots 603, 604, 602 and 601 respectively, in an order of disposing the memory module 41 on the surface mounted slot 603 of the first memory channel 62, disposing the memory module 42 on the through hole slot 604 of the first memory channel 62, disposing the memory module 43 on the surface mounted slot 602 of the second memory channel 61 and then disposing the memory module 44 on the through hole slot 601 of the second memory channel 61.

Next, in step 706, the set of signal wires S are disposed under the surface mounted slot 603 of the first memory channel 62 and/or the surface mounted slot 602 of the second memory channel 61, as shown in FIG. 4.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

Further, in describing representative examples of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

I claim:

1. A main board, comprising:
    a first set of memory slots, the first set of memory slots comprising a first channel and a second channel disposed in parallel with each other, and each of the first channel and the second channel comprising a first type of slot and a second type of slot respectively,
    wherein the first type of slot and the second type of slot of the first channel are disposed at a first side and a second side of the first channel respectively, the first type of slot and the second type of slot of the second channel are disposed at a first side and a second side of the second channel respectively, and the first side of the first channel is adjacent to the first side of the second channel, and
    wherein the first type of slot is a surface mounted slot and the second type of slot is a through hole slot.

2. The main board of claim 1, further comprising a first set of signal wires disposed under the first type of slot of the first channel of the first set of memory slots and/or the first type of slot of the second channel of the first set of memory slots.

3. The main board of claim 2, further comprising a central processing unit (CPU) disposed adjacent to the second side of the second channel of the first set of memory slots.

4. The main board of claim 3, further comprising a second set of memory slots disposed at another side of the CPU with respect to the first set of memory slots.

5. The main board of claim 4, wherein the second set of memory slots comprise a first channel and a second channel disposed in parallel with each other.

6. The main board of claim 5, wherein each of the first channel and the second channel of the second set of memory slots comprises a through hole slot and a surface mounted slot respectively.

7. The main board of claim 6, wherein the surface mounted slot of the first channel of the second set of memory slots is disposed adjacent to the surface mounted slot of the second channel of the second set of memory slots.

8. The main board of claim 7 further, comprising a second set of signal wires disposed under the surface mounted slot of the first channel of the second set of memory slots and/or the surface mounted slot of the second channel of the second set of memory slots.

9. A main board, comprising:
    a first set of memory slots, the first set of memory slots comprising a first channel and a second channel disposed in parallel with each other, and each of the first channel and the second channel comprising a surface mounted slot and a through hole slot respectively,
    wherein the surface mounted slot and the through hole slot of the first channel are disposed at a first side and a second side of the first channel respectively, the surface mounted slot and the through hole slot of the second channel are disposed at a first side and a second side of the second channel respectively, and the first side of the first channel is adjacent to the first side of the second channel.

10. The main board of claim 9, further comprising a first set of signal wires disposed under the surface mounted slot of the first channel of the first set of memory slots and/or the surface mounted slot of the second channel of the first set of memory slots.

11. The main board of claim 10, further comprising a central processing unit (CPU) disposed adjacent to the second side of the second channel of the first set of memory slots.

12. The main board of claim 11, further comprising a second set of memory slots disposed at another side of the CPU with respect to the first set of memory slots.

13. The main board of claim 12, wherein the second set of memory slots comprise a first channel and a second channel each of which comprising a through hole slot and a surface mounted slot respectively.

14. The main board of claim 13, wherein the surface mounted slot of the first channel of the second set of memory slots is disposed adjacent to the surface mounted slot of the second channel of the second set of memory slots.

15. The main board of claim 14, further comprising a second set of signal wires disposed under the surface mounted slot of the first channel of the second set of memory slots and/or the surface mounted slot of the second channel of the second set of memory slots.

* * * * *